April 14, 1931. H. B. McCABE 1,800,553
MACHINE FOR MEASURING UNBALANCE IN A ROTATIVE BODY
Filed Aug. 26, 1929 8 Sheets-Sheet 1
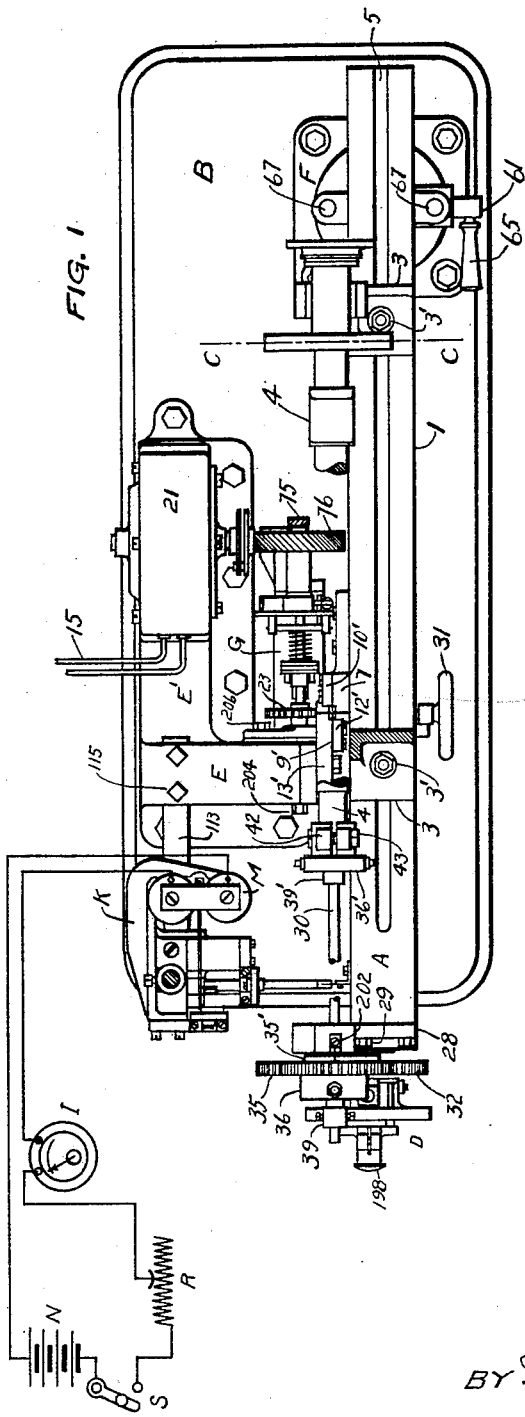
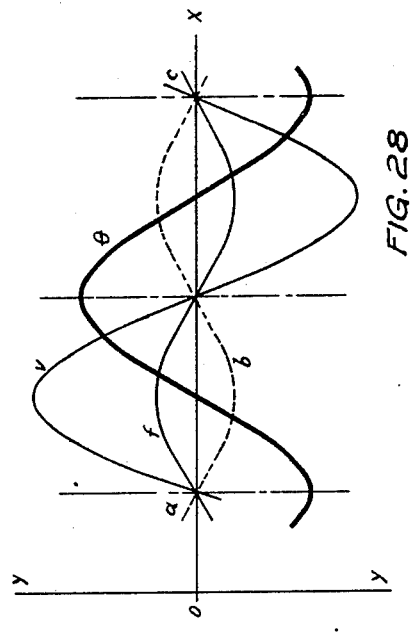
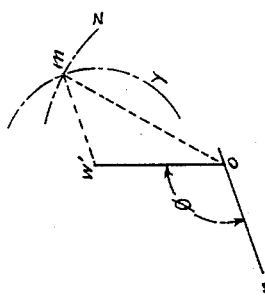
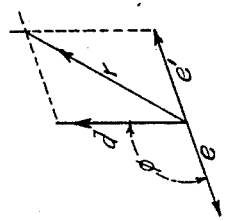
INVENTOR:
HORACE B. McCABE,
BY Fisher, Clapp, Soans + Pond,
ATTORNEYS.

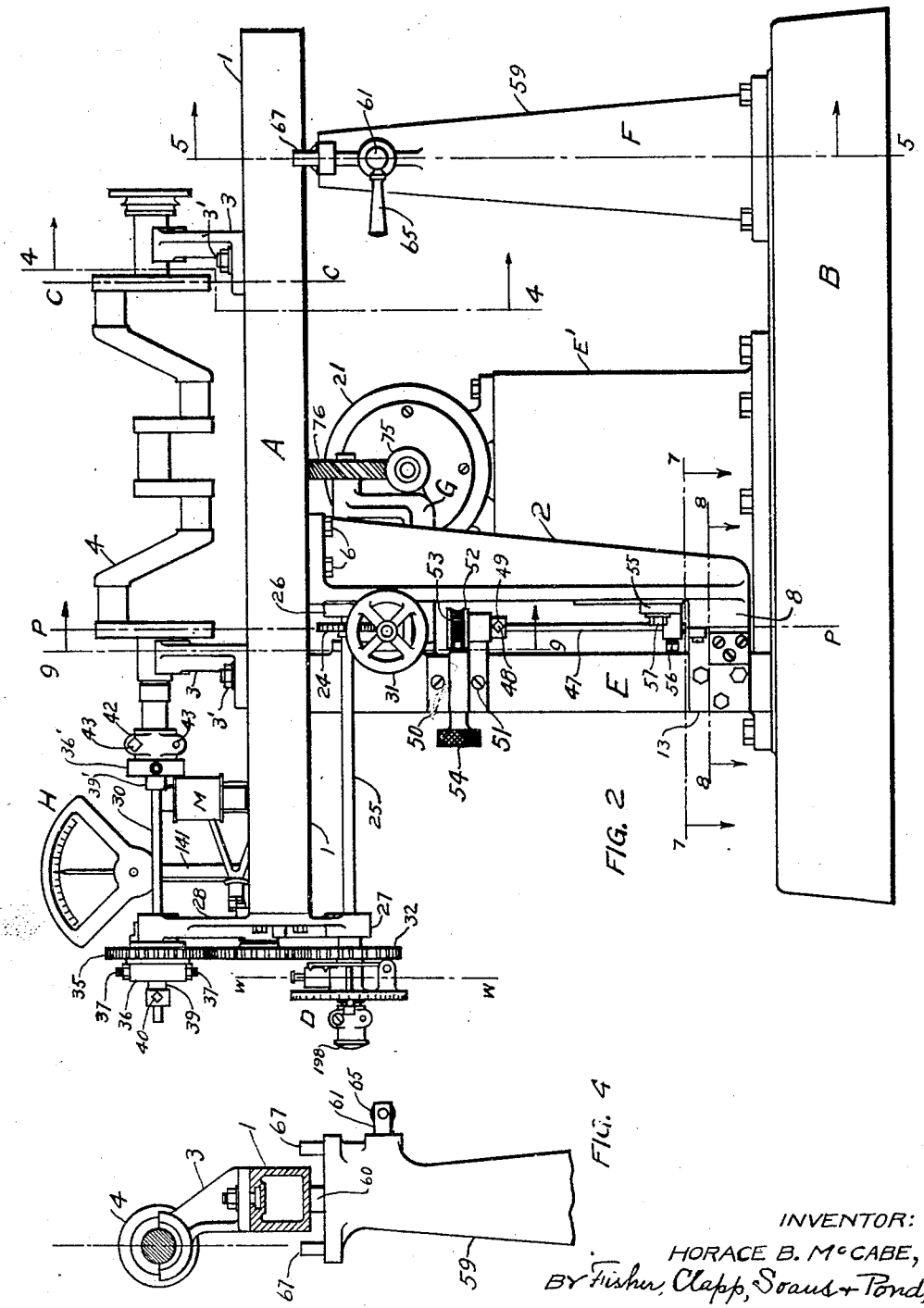

April 14, 1931.  H. B. McCABE  1,800,553
MACHINE FOR MEASURING UNBALANCE IN A ROTATIVE BODY
Filed Aug. 26, 1929   8 Sheets-Sheet 3
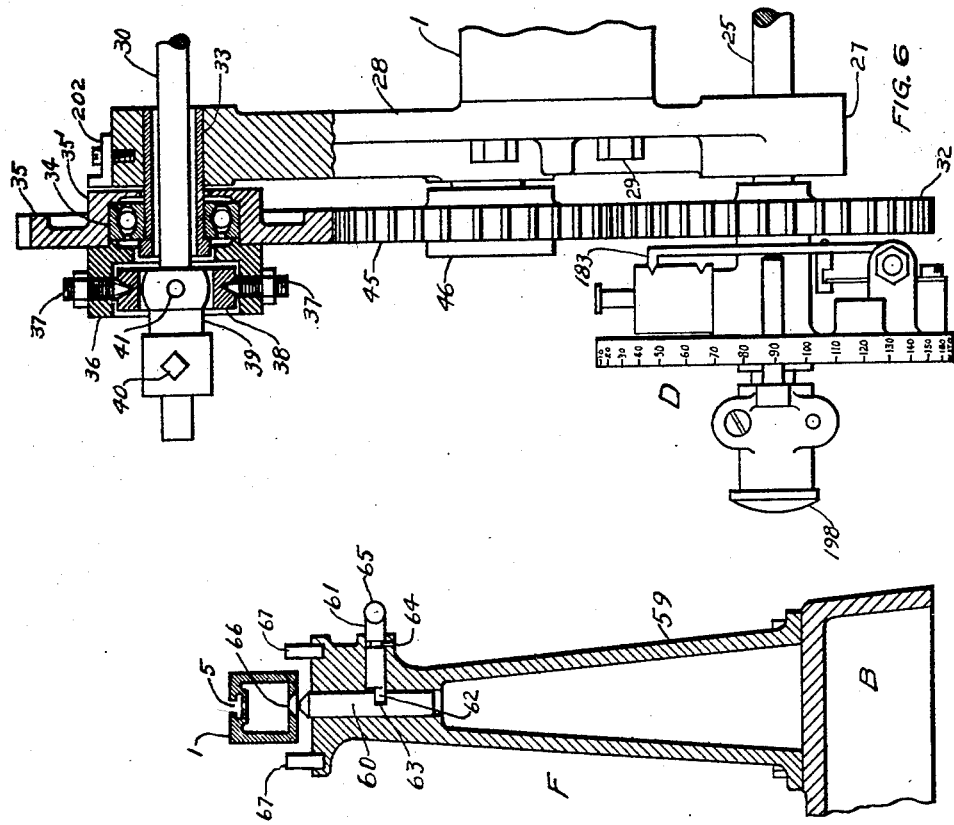
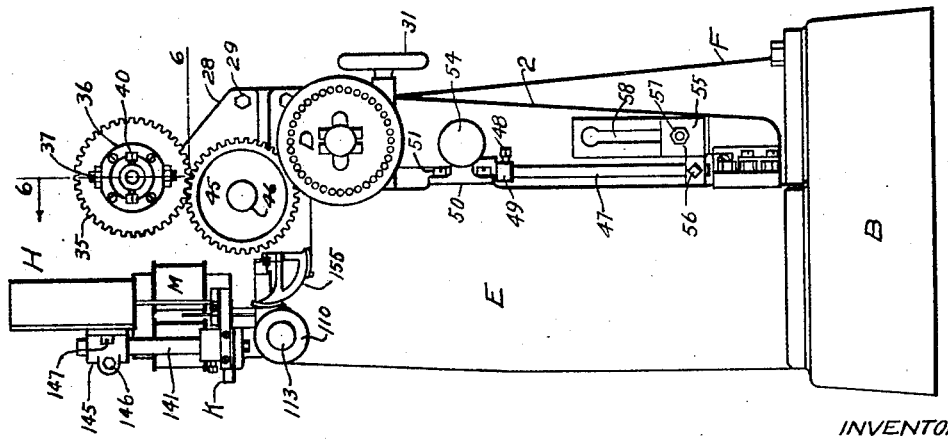
INVENTOR:
HORACE B. McCABE,
BY Fisher, Clapp, Soans & Pond,
ATTORNEYS April 14, 1931.   H. B. McCABE   1,800,553
MACHINE FOR MEASURING UNBALANCE IN A ROTATIVE BODY
Filed Aug. 26, 1929    8 Sheets-Sheet 4

INVENTOR:
HORACE B. McCABE
ATTORNEYS

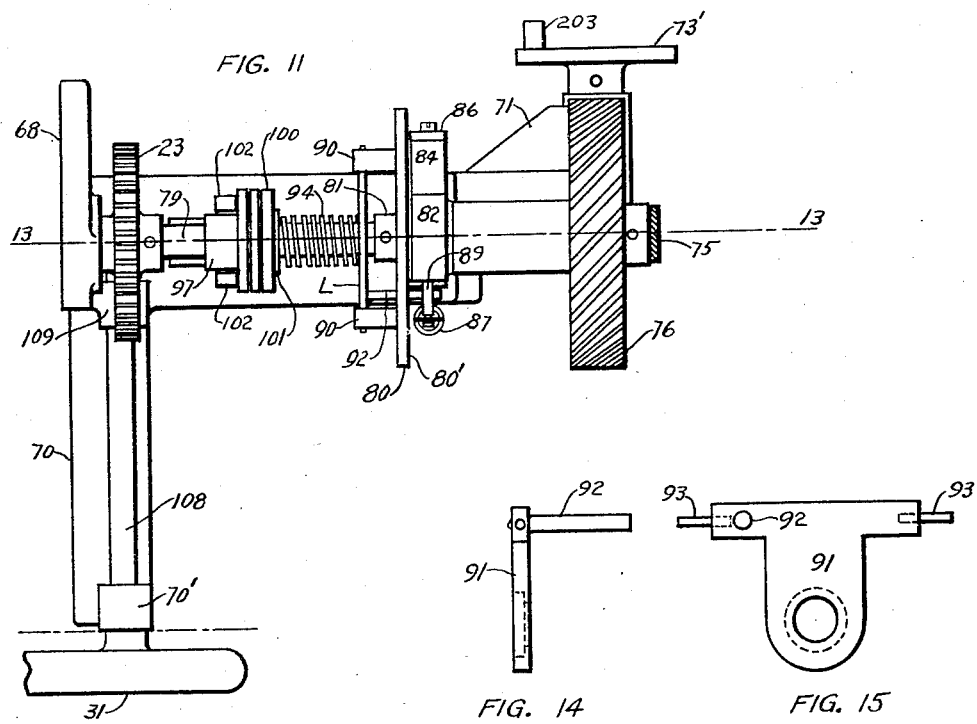
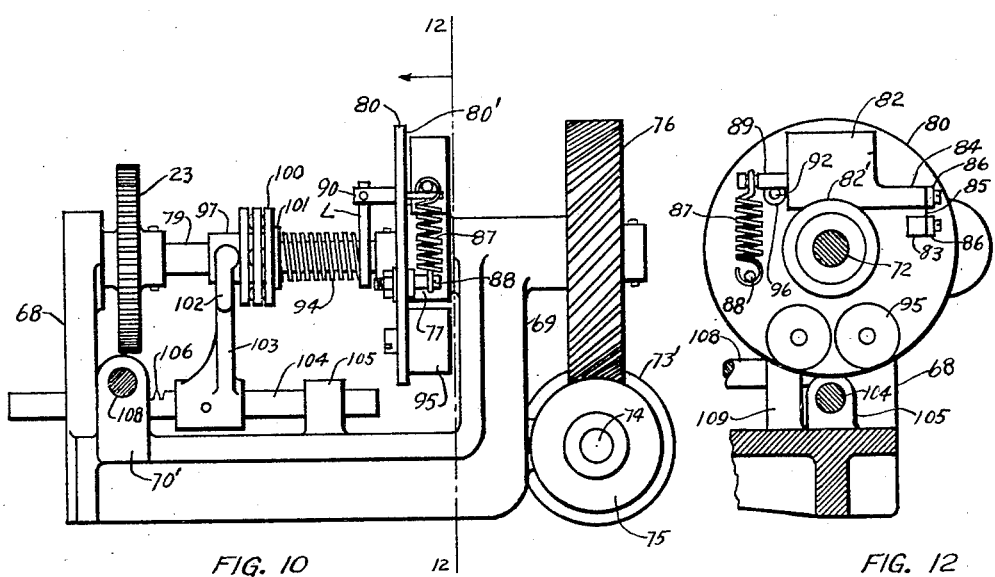

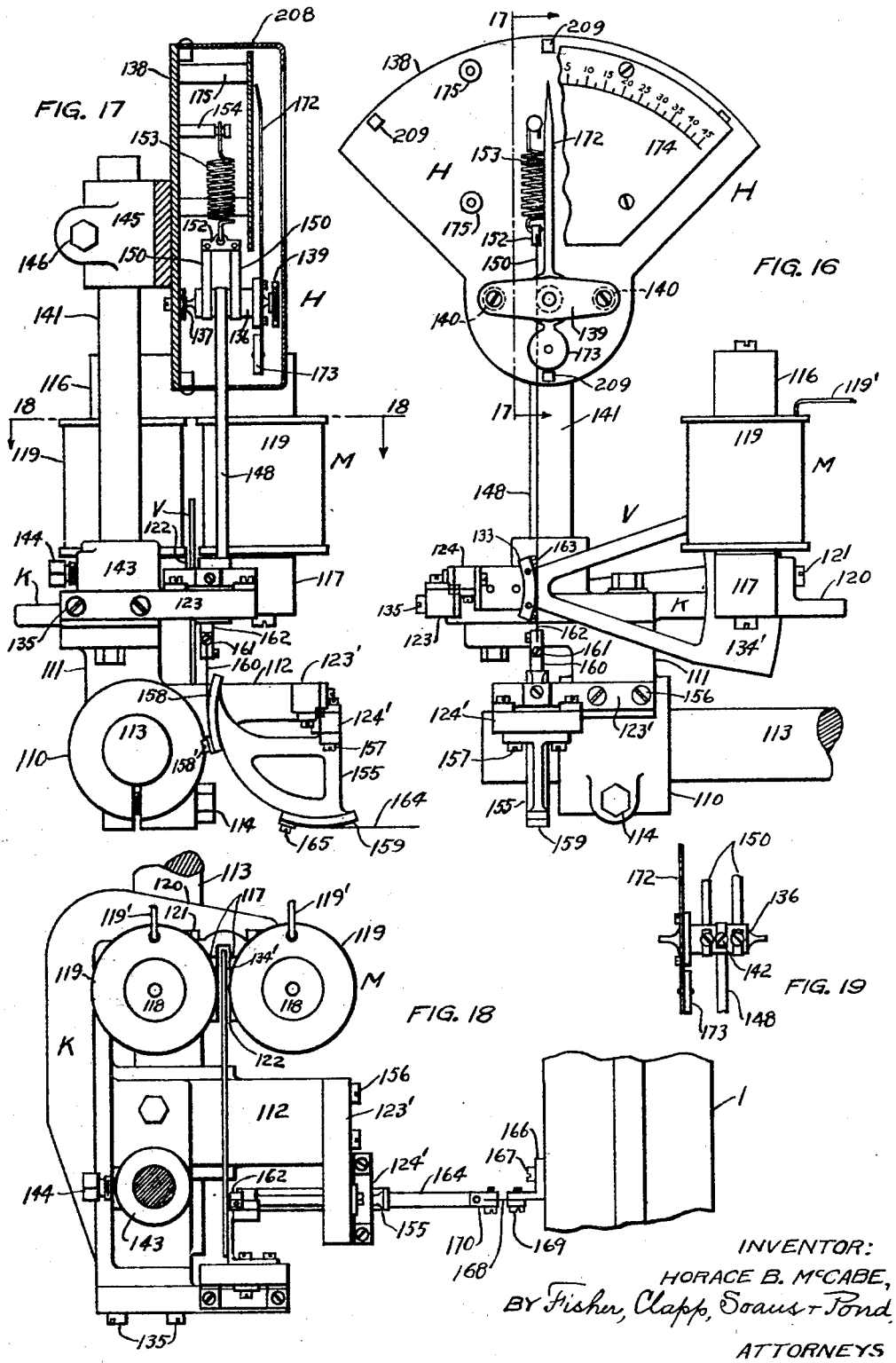

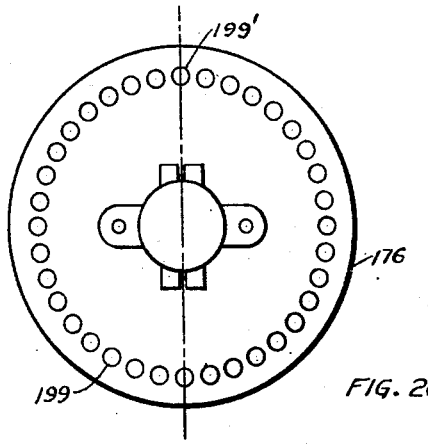
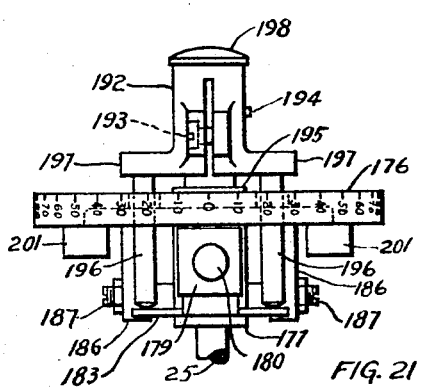
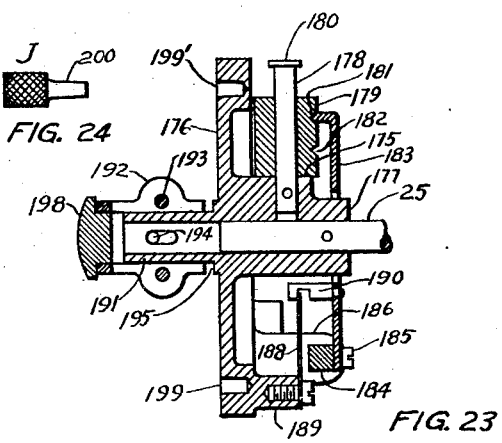
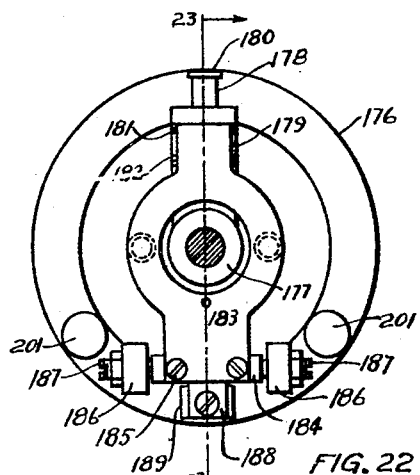
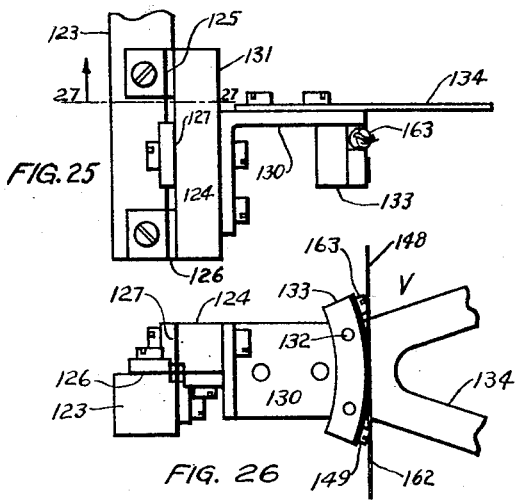
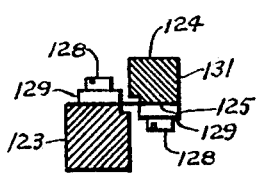

Patented Apr. 14, 1931

1,800,553

UNITED STATES PATENT OFFICE

HORACE B. McCABE, OF MADISON, WISCONSIN, ASSIGNOR TO EVA McCABE, OF MADISON, WISCONSIN

MACHINE FOR MEASURING UNBALANCE IN A ROTATIVE BODY

Application filed August 26, 1929. Serial No. 388,391.

The invention relates to improvements in machines for measuring rotative unbalance and particularly to that class in which the unbalanced body to be tested is rotated in bearings attached to a support or frame that is pivoted to oscillate about an axis perpendicular to the axis of rotation. In machines of this class the centrifugal force generated by the rotation acts on the pivoted frame to produce a turning moment about the pivotal axis, and the magnitude of the corrections to be applied to the rotative body to effect a condition of balance is ascertained by measuring this turning moment.

The object of the invention is to provide an improved balancing machine that will be sensitive and respond to slight degrees of unbalance, and by which the magnitude and position for correction for unbalance may be quickly ascertained by a method of direct measurement.

The invention possesses several important features which will be brought out clearly in the following specifications by the aid of the accompanying drawings. In the drawings I have shown one form of the machine in which the rotating body is constrained to oscillate in a horizontal plane under the control of a torsion spring, but it is understood that I do not limit myself to this form, since the invention as set forth in the claims may be embodied in other forms wherein the body oscillates in a vertical plane and under the control of any other type of spring.

Referring to the said drawings:

Fig. 1 is a plan view, Fig. 2 a front elevation and Fig. 3 an end elevation of the machine.

Fig. 4 is a cross section on the line 4—4, and Fig. 5 a cross section on the line 5—5 of Fig. 2.

Fig. 6 is a detached front view of the mechanism on the end of the frame, being partially in section on the line 6—6 of Fig. 3 and drawn to an enlarged scale to clearly disclose the portion of the mechanism shown in the sectional portion.

Fig. 10 is a front elevation, and Fig. 11 a plan view of the speed governing mechanism, both views being drawn to the same enlarged scale.

Fig. 12 is an end view in section on the line 12—12 of Fig. 10.

Fig. 14 is an enlarged elevation, and Fig. 15 an enlarged end view of detail of the speed governing mechanism shown in Figs. 10, 11, and 13.

Fig. 16 is a front elevation of an oscillation damping device and amplitude indicator.

Fig. 17 is an end view of the damping device and amplitude indicator, being a section on line 17—17 of Fig. 16.

Fig. 18 is a plan view of the damping device, being a section on the line 18—18 in Fig. 16.

Fig. 19 is a view looking from the reverse direction, of the drum member in mechanism shown in Fig. 17.

Figure 7:
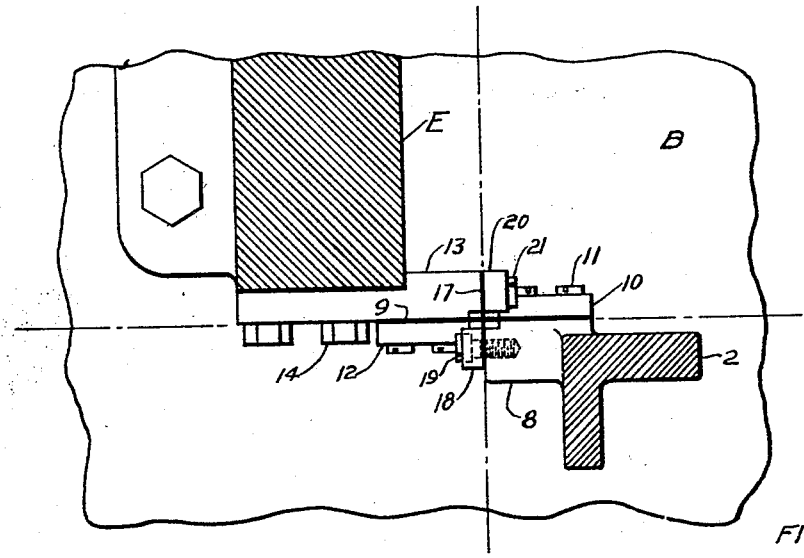
Fig. 7 is a section on line 7—7.

Figs. 20, 21, 22, and 23 are views on an enlarged scale of a detached unit of the mechanism; Fig. 20 being an end view as seen from the left in Fig. 2. Fig. 21 a plan view, Fig. 22 an end view showing the reverse side from that shown in Fig. 20 and Fig. 23 an elevation in section on the center line 23—23 in Fig. 22.

Fig. 24 is a view of an auxiliary part used in connection with the mechanism shown in Figs. 20 to 23 inclusive.

Fig. 25 is a plan view and Fig. 26 a front elevation of a detached portion of the damping device, both views being drawn to an enlarged scale.

Fig. 27 is a section on the line 27—27 of Fig. 25, being drawn to the same scale.

Fig. 28 is a sine curve diagram to be referred to in connection with the explanation of the fundamental principles on which the invention is based.

Figs. 29 and 30 are force diagrams to be referred to in connection with the explanation of the method employed for determining the phase angle of unbalance.

Figures 1 to 5 inclusive are all drawn to the same scale. Figures 6 to 13 and 16 to 24 inclusive are drawn uniformly to an enlarged scale of about three to one over that of Figures 1 to 5. Figures 14, 15, 25, 26 and 27 are drawn to a still more enlarged scale, being about two to one over that of Figures 6 to 13.

Inspection of the drawings will reveal that essentially the machine consists of a heavy base to which is attached a rigid upright supporting member on which is mounted a pair of pivots disposed in vertical alignment. These pivots support a frame member on which the body to be tested is rotatably mounted in suitable bearings. With this arrangement, the frame member, and the rotative body are capable of oscillating motion in a horizontal plane about a vertical axis through the pivots. The construction of the pivots is such that the frame will oscillate freely without any appreciable retarding effect due to friction.

A comparatively stiff spring is connected between the supporting member and the pivoted frame in such a manner as to control the movement of the latter and produce a free oscillating system that will oscillate in a horizontal plane with angular harmonic motion, and with a natural period of oscillation depending on the stiffness of the spring, and in a manner corresponding to that of a torsion pendulum.

In this specification I will use the term "correction" to designate weight added or material removed in the process of correcting the unbalance in a rotative body. In order to determine the magnitude for corrections to apply to a rotative body in order to effect a condition of running balance, it is necessary to measure the magnitude and direction of the resultant of all centrifugal forces that act on its axis during rotation. The only manner in which this resultant force manifests itself is through displacement of mass. In the case of the machine to be described, the force acts to produce angular displacement of the pivoted system about the vertical axis of same. The magnitude of the displacement depends upon the magnitude of the force, the length of time during which the force acts, and the moment of inertia of the system about the pivotal axis. Under conditions in which the speed of rotation is constant, the resultant force and the time will both be constant, and the displacement will therefore be directly proportional to the moment of inertia of the frame and its load, about the vertical pivotal axis. It follows that, in order to obtain the maximum displacement, or in other words the maximum of sensitivity, the moment of inertia of the oscillating system must be made as low as possible. With this point in view the pivoted frame member in the machine here described, is so designed as to reduce the moment of inertia to an extent as great as compatible with rigidity, and the motor which furnishes power to rotate the body being tested, instead of being mounted on the frame, is attached to the base of the machine.

In order that a maximum displacement may be obtained, it is further necessary that the pivoted frame member be free to turn on the pivots with a minimum of frictional retarding effect, and without being influenced by any disturbing forces. This means that the connection between the motor and the rotating body, for transmitting power to same, must be so designed as to produce no appreciable retarding or accelerating effect on the oscillating movement of the frame while the body is being rotated. With this requirement in mind, a novel form of transmission gearing has been developed, which is a feature of the invention to be later described.

In an unbalanced body being tested on the machine, the resultant centrifugal force generated acts on the axis of rotation in a constantly changing radial direction. But the frame on which body is being rotated is constrained to swing about its pivotal axis in a horizontal plane only, so it is only the horizontal component of the centrifugal force generated that acts on the pivoted frame to effect angular displacement thereof. During a half revolution of the unbalanced body, this horizontal component varies from zero, which occurs where the centrifugal force is acting in a vertical direction, to a maximum value that is equal to the centrifugal force, and occurs when the same is acting in a horizontal direction. Now in measuring unbalance in a machine of this type, what we actually deal with is not this horizontal component, but rather the moment of same about the pivotal axis of the oscillating frame. However it is easier to think of a force than it is to think of the moment of force, so for the sake of clearness and brevity I will herein refer to this moment as a force, and designate it by the letter $f$. Therefore, where the force $f$ is mentioned, it must be understood to mean the moment of the horizontal component of the centrifugal force about the pivotal axis. Further; the displacement of the frame due to force $f$ is angular displacement, but it is more convenient to call it simply displacement so, when displacement of the frame is mentioned herein, it should be understood that angular displacement about the pivotal axis is meant. For the same reasons the angular velocity of the frame while oscillating will be called simply velocity. I will designate the displacement by the character $\theta$, and the velocity of oscillation by the letter $v$.

In cases where the unbalance of the body being tested is slight, the extent to which the force $f$ will manifest itself in displacement will be correspondingly slight, and may be of such extremely small magnitude as to be difficult to measure. It can be demonstrated that the displacement due to the force $f$ is independent of the speed of rotation; depending only on the moment of inertia of the oscillating system. It is therefore evident that increasing the speed of rotation will not help the situation, so it is common practice in balancing machines to take advantage of the building up of displacement that occurs when the speed of rotation is such that one revolution takes place in the exact time of the natural period of the frame with its load. This is known as resonance speed, and at this speed very small increments of displacement are added indefinitely. If rotation is continuous at this speed the displacement will build up until the force $f$ is neutralized by certain damping forces which become appreciable where the displacement becomes excessive.

In order to take advantage of this building up phenomenon that occurs at resonance speed it is evidently very necessary to be able to adjust the speed with a fine degree of accuracy, and to maintain resonance speed for an appreciable length of time so that readings for displacement may be taken. To meet this requirement I have devised a novel form of speed adjusting and governing mechanism which constitutes another novel feature of this invention to be later described.

When an unbalanced body is being rotated on the frame at resonance speed, the same will oscillate on its pivots with substantially simple harmonic motion. In the pure harmonic motion of a mass controlled by a spring, the force is derived directly from the spring alone, and this spring force is a harmonically varying force that is always directly proportional to, and exactly in phase with the displacement. In the balancing machine, where an unbalanced body is rotated on a pivoted frame, this spring force has superposed upon it the force $f$, due to the rotation. This force $f$ is also a harmonically varying force, but it is a well established fact that, at resonance speed, it is not in phase with the displacement, but leads the same by almost exactly a quarter period.

As harmonic motion may be graphically represented by a sine curve I have shown in the diagram, Fig. 28, a group of such curves. In this diagram, distance on the axis $o\,x$ represents time, the space $a\,c$ thereon representing the period of oscillation; and distance on the axis $o\,y$ may represent any quantity that varies in a harmonic manner. The curve marked $\theta$ represents the displacement of the pivoted frame, and the curve marked $f$ represents the force $f$, which, as the relative positions of the two curves indicate, leads the displacement by a quarter period, in accordance with statement in the preceding paragraph. The velocity $v$ of the frame as it oscillates on its pivots is also a harmonically varying quantity and it also leads the displacement by a quarter period, being maximum when the displacement is zero and zero when the displacement is maximum. The curve $v$ in the diagram represents the velocity which, as may be seen, is in phase with the force $f$.

Incorporated in the machine constituting this invention is a device for applying a damping force, the magnitude of which is exactly proportional to the velocity $v$. This force, which I will designate by the letter $b$, is in phase with the velocity and acts in a direction to oppose it. Therefore it is evident that it is also in phase with the force $f$ and acts to oppose same.

In the operation of the machine, while the unbalanced body is being rotated at resonance speed, the amplitude of displacement of the oscillating frame will build up to a point where the magnitude of the damping force will exactly equal the magnitude of the force $f$. The dotted curve $b$ in the figure represents the damping force when this point is reached. The force $b$, being in phase with and opposing the force $f$, the effect of the latter will then be completely neutralized, and the pivoted frame will oscillate under the control of the spring alone, and therefore with pure harmonic motion.

Due to the character of the damping device above referred to, the damping force $b$ is proportional to the velocity $v$. The force $f$, being equal to the damping force $b$, must also be proportional to the velocity $v$. This being true, the maximum value of $f$ must be proportional to the maximum value of $v$. Now the maximum value of $f$ as above explained, is equal to the centrifugal force generated in the rotating body being tested, so it follows that the centrifugal force is proportional to the maximum value of the velocity $v$. Now it is a well known law of mechanics that when a mass is oscillating with harmonic motion, the maximum velocity is proportional to the maximum displacement. Therefore, if the centrifugal force is proportional to the maximum velocity, it is also proportional to the maximum displacement. It follows that; under the conditions above given, the amplitude of oscillation (which is the maximum displacement) may be considered a measure of the centrifugal force. Hence the amplitude, multiplied by a suitable constant, will give the magnitude of correction to apply to the rotative body being tested, to effect a condition of balance in same.

An amplitude meter for measuring the amplitude of oscillation of the pivoted frame is incorporated in the construction of the machine here described. From the amplitude meter reading the magnitude of the correction to apply to the body being tested is obtained in the manner above explained. The radial direction or phase of the correction is ascertained by a method involving the application of a provisional correction, two measurements being required. The method will be fully described later in connection with a device for automatically applying the provisional correction, which device is incorporated in the construction of the machine.

Having now described the essential features of the machine and the principles on which its operation is based, I will proceed to describe the constructional details of the machine by the aid of the drawings.

The base, designated by the letter B has rigidly mounted on it the upright supporting member E. On this supporting member is pivotally supported the frame, which is designated as a unit by the letter A.

The frame comprises two main members viz; the horizontal bar 1 and the upright bracket member 2. Adjustably secured to the bar 1 are two upright supports 3 3. These supports are provided with half bearings adapted to receive the journals of a body to be tested. The body to be tested, which, for convenience will hereinafter be referred to as the rotor, is here shown as a familiar type of gas engine crankshaft, and is designated by the number 4.

The upright supports, 3 3, are clamped to the bar 1 by means of the bolts 3′ 3′, the heads of which are slidably fitted in the longitudinal T slot 5, thus providing a means whereby the supports may be located to suit the spacings of the journals on different types of rotors.

Figure 9:
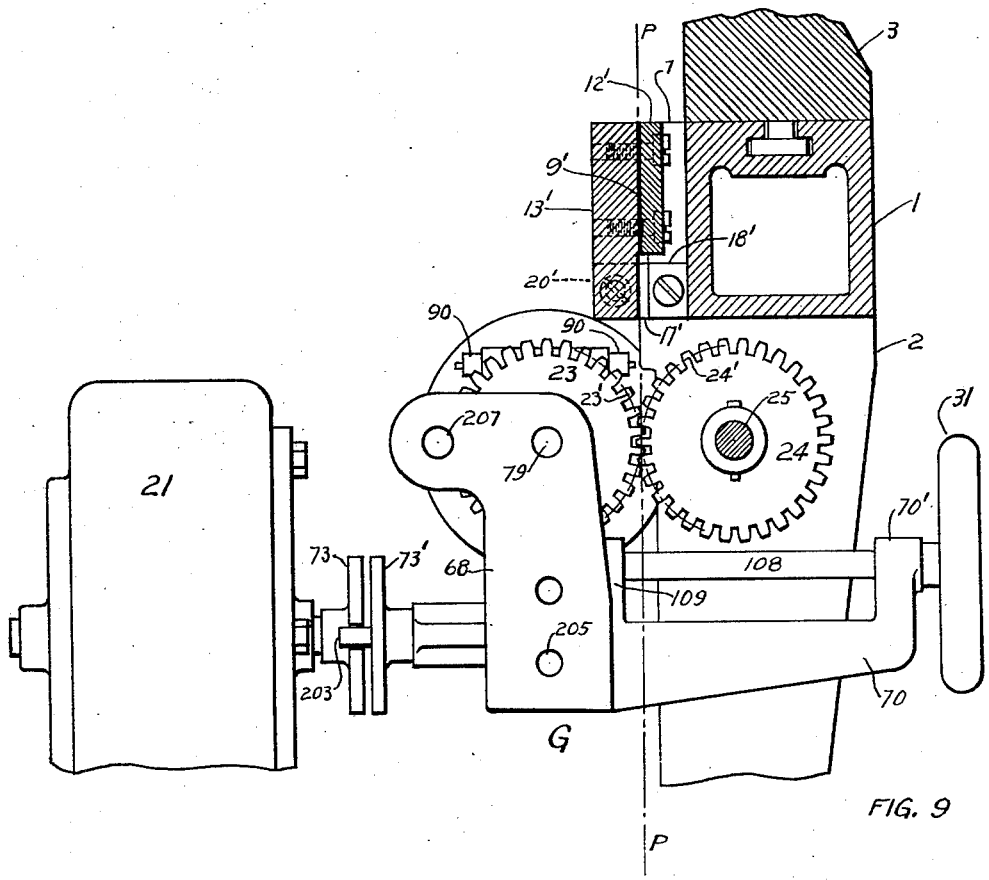
Fig. 9 is a section on the line 9—9 in Fig. 2 drawn to an enlarged scale, and showing the manner in which the rotary motion is transmitted from an electric motor to the driving shaft on the oscillating frame member.
Figure 13:
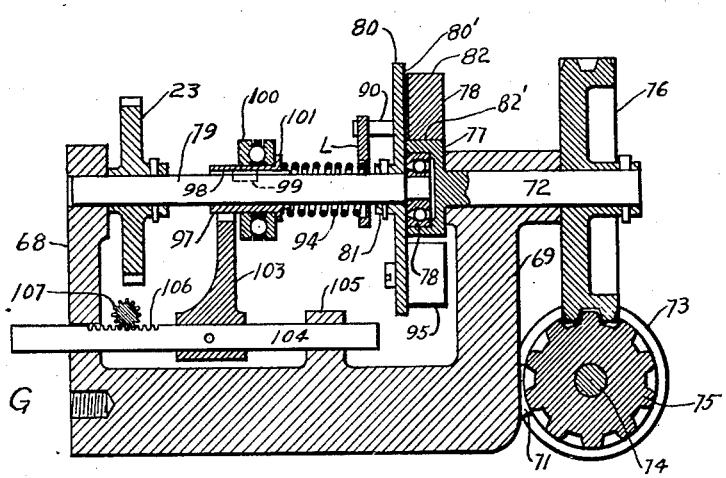
Fig. 13 is a vertical section of the speed governing device on the center line 13—13 of Fig. 11.

The bracket member 2 is secured to the underside of bar 1 by means of two cap screws 6. It is provided with two plate like projections 7 and 8, the faces and ends of which are in vertical alignment. The upper projection 7 extends upward adjacent the side face of bar 1 as indicated in Figures 1 and 9. These projections form bases for the attachment of flat plate springs constituting the pivots on which the frame A, as a unit, oscillates.

Figure 8:
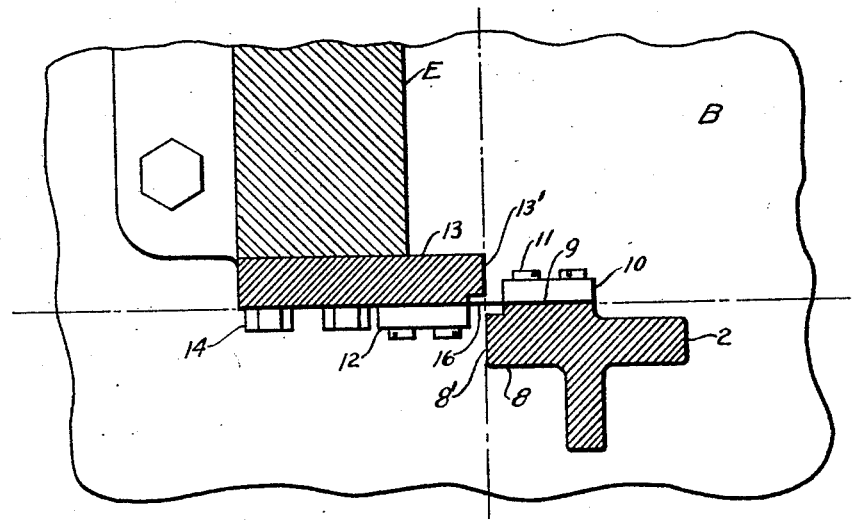
Fig. 8 is a section on line 8—8 in Fig. 2, both being plan views of the mechanism known as the lower spring pivot, and both being drawn to an enlarged scale.

The construction of the spring pivots may be understood by reference to Figures 7 and 8, in which 9 designates a flat steel plate spring, one end of which is clamped securely between cap 10 and projection 8 by means of screws 11, the other end being similarly clamped between cap 12 and a plate like member 13. The plate 13 is secured to the lower portion of the supporting member E by means of cap screws 14 as indicated. The end faces 13′ of plate 13 and 8′ of projection 8 are substantially in the same vertical plane, and the corners of each are rabbeted as shown, so that a short portion 16 of spring 9 is free to flex. This constitutes the lower spring pivot on which the frame A oscillates.

An auxiliary flat spring 17 is disposed above, and at right angles to the spring 9. This is shown clearly in Fig. 7, which figure, being a section on line 7—7 in Fig. 2, is a top view of the complete pivot mechanism as a unit. The spring 17 is clamped to the end face of projection 8 by means of cap 18 and screw 19, and to the end face of plate 13 by means of cap 20 and screw 21.

The spring 9, is the principal spring, and serves to support the load, while the auxiliary spring 17 serves to prevent distortion of spring 9 by any side pressure, and to confine the flexing of same to practically a point lying in the line of intersection of the two springs.

The construction of the upper spring pivot mechanism is identical with that of the lower one just described, excepting that the auxiliary spring is located below instead of above the principal spring; the plate 13′ (Figures 1 and 9) corresponding to the plate 13, and being secured to the support E in the same manner, as may be seen by reference to Fig. 1. The principal spring 9′ is clamped to the projection 7 by means of cap 10′, and to plate 13′ by means of cap 12′, these two caps being duplicates of caps 10 and 12, and are secured by means of screws to the members 7 and 13′ in the same manner that caps 10 and 12 are secured to the members 8 and 13. The auxiliary spring 17′ (see Fig. 9) is a duplicate of spring 17. It is placed below spring 9′ and lies in a direction at right angles to that of 9′ as shown. It is clamped to projection 7 by means of clamp 18′, and to plate member 13′ by means of clamp 20′, (shown in dotted lines in Fig. 9), these two clamps being duplicates of clamps 18 and 20, and are secured in place by screws in the same manner.

The purpose and functioning of the springs 9′ and 17′, which comprise the upper pivot are the same as that of springs 9 and 17 which comprise the lower pivot. The parts are so positioned that springs 9 and 9′, lie in the same vertical plane in a direction longitudinal with respect to the frame A, and the springs 17 and 17′ lie in the same vertical plane in a direction transverse to the frame A. Thus, the intersections of the two pairs of springs form a vertical pivotal axis about which the frame A can oscillate.

Power for turning the rotor is provided by an electric motor 21, which is mounted on a branch E′ of the supporting member E.

Leads for connecting the motor to a source of current supply are indicated at 15. The motion is transmitted through a coupling to the drive shaft of an adjustable speed governing device which is designated on the drawings as a unit by the letter G. From this the motion is transmitted from a spur gear 23, which is part of the governing device, to a like spur gear 24 on a shaft 25 which is journalled at one end in bearing 26 in the bracket member 2, and at the other in bearing 27 located in a gear bracket 28 which is secured to the end of bar 1 by means of screws 29.

From shaft 25 the motion is transmitted through a train of gears mounted on gear bracket 28 to a drive shaft 30 which is connected to the rotor 4 by means of a suitable adapter which will be later described.

I will now proceed to describe in detail the mechanism for transmitting the motion from the adjustable governing device G to the rotor, leaving the description of this device G and an explanation of its operation to be taken up later. It will be sufficient for the present to state that it functions to impart a uniform speed of rotation to the gear 23, and provides a means of adjusting the speed by the manipulation of a hand wheel 31.

Referring to Fig. 9 it may be seen that the gears 23 and 24, above referred to, are in mesh on the line of the pivotal axis P P. They are so positioned that their pitch circles 23' and 24' are each substantially tangent to this axis. The teeth on these two gears are so formed as to provide considerable back lash, and also a substantial clearance space between the tops and bottoms of the teeth. In the design of the gears, advantage is taken of the fact that the load on them is very light and they are accordingly made with narrow faces. It may be seen that the construction above described allows a limited angular divergence of the plane of gear 24 with that of gear 23 without producing any cramping condition. As the tangent point of the pitch circles lies in the pivot line P—P, it is quite plain that motion may be transmitted from gear 23 to gear 24 without imparting the slightest impulse to modify the oscillation of frame A on the spring pivots, and, except for the effect of a very slight friction between the teeth in mesh (found in practice to be negligible), the frame will oscillate with perfect freedom.

On the outer end of shaft 25 is mounted a spur gear 32 (see Fig. 6) and also a rotary disc which may be thrown out of balance a known amount at will. This device is designated as a unit by the letter D, and the mechanism and purpose of same will be later explained.

In a bore in the upper end of gear bracket 28, concentric with the axis of the rotor 4, is tightly fitted a stud 33. (See Fig. 6.) This stud supports a ball bearing 34 of the radial type, the outer race of which fits a concentric bore in a spur gear 35. The ball bearing is held in place in said bore by means of a cap member 36, which is secured to the side of the gear by means of screws as indicated in Fig. 3. The said cap member 36 is bored to form a ring like wall, as may be seen in Fig. 6. Threaded in this wall are two pointed pivot screws 37 radially disposed and in diametrically opposite positions. This cap 36 in connection with the gear 35 and screws 37 constitutes the outer member of a universal joint of the gimbal type.

The conical points of screws 37 engage diametrically opposite countersunk depressions in a ring 38, which constitutes the intermediate member of the universal joint.

The inner member of the universal joint is designated by the number 39. This member is concentrically bored to receive the rotor driving shaft 30 which serves to transmit the rotary motion of gear 35 to the rotor 4. The enlarged end of member 39 contains two set screws 40 oppositely disposed for the purpose of balance. These screws serve to grip the shaft 30 in any desired endwise position. The other end of member 39 which lies within the ring member 38, contains two countersunk depressions, one of which is shown at 41, (Fig. 6), the other being in a diametrically opposite location. These depressions lie on a diametral axis that is at right angles with the axis of pivot screws 37, and form seats for two conically pointed pivot screws, (not shown), similar to screws 37 that are threaded in diametrically opposite holes in the intermediate member 38.

Referring to Figs. 1 and 2, 42 designates an adapter or coupling of the familiar split collar type, which encircles the end of the rotor 4 and is held in gripping contact therewith by means of clamping screws 43, the same being oppositely disposed to effect a balance.

One the end of the coupling member 42 and integral therewith is a ring-like wall 36' which constitutes the outer member of a universal joint, the construction of which is the same as that of the above described universal joint, except that the inner member 39' (corresponding to member 39), instead of being adjustable on shaft 30 is rigidly secured thereto by any suitable means.

The arrangement of the two universal joints, one on the driving gear and the other on the rotor, as indicated, insures smooth running and absence of any cramping effect due to lack of precise alignment of parts. The shaft 30, being adjustable endways in the member 39, enables the rotor to be mounted in any desired position endwise on the frame A.

Referring to Figs. 3 and 6, the rotary motion of the gear 32 is transmitted to gear 35 through the intermediate or idler gear 45 which is mounted on a stud 46. Gears 32 and 35 have equal numbers of teeth so the rotor will be turned in unison with the shaft 25 and also with gears 23 and 24.

On the face of a hub portion 35' of the gear 35 is a mark which cooperates with an index mark on the clip 202 to indicate a zero angular position for the rotary disc D above referred to. This is more clearly seen in Figures 1 and 6.

Oscillation of the frame A is controlled by a torsion rod 47, the upper end of which is secured by means of set screw 48 in a concentric hole in the enlarged lower end or head 49 of a short vertical shaft which is journaled in a bracket member 50. This member is secured to the upright support E by means of the two screws 51 as shown. Mounted on the said short vertical shaft at its upper end is a worm wheel 52, which is engaged by a worm 53. This worm is carried by one end of a short horizontal shaft on which is mounted at the other end, the thumb knob 54. It is quite plain that rotary motion given to the thumb knob will be transmitted through the said worm and worm wheel, to head 49, in which the torsion rod 47 is clamped, thus providing a means by which the rod may be tensioned in one direction or the other at will.

The lower end of torsion rod 47 is adjustably clamped in a vertical hole in block 55 by means of a set screw 56. This block is secured to the bracket member 2 by means of bolt 57, the head of which slidably fits a slot 58 in said bracket member. By means of this bolt and the set screw 56 the block may be secured in different positions along the slot 58, and the rod clamped in same to vary the working length of the rod and hence its torsion constant.

For the purpose of rigidly supporting and preventing oscillation of the frame A while rotors are being mounted on or removed from the machine for testing, a pillar, designated as a unit by the letter F, is mounted on the base B near the end of frame A. The body member 59 of this pillar contains at its upper end a bore, in which is slidably fitted a plunger bolt 60. Means are provided for raising and lowering this bolt a limited distance, said means comprising a shaft 61, journaled in a horizontal bore in the body member 59, the axis of which intersects the axis of bolt 60. On the inner end of shaft 61, and integral therewith is an eccentric stud 62. This stud engages a transverse slot 63 in the bolt 60. The shaft 61 is prevented from endwise movement by a transverse pin 64 secured in the body 59 which projects into an annular groove in shaft 61, as indicated plainly in Fig. 5. On the outer end of shaft 61 is attached an operating handle 65 by which the same may be turned to actuate the eccentric stud 62 to raise or lower the bolt 60. The upper end of bolt 60 is tapered as shown, and in its lowermost position rests in close proximity to the bottom face of the bar 1. The bolt is positioned in axial alignment with a hole 66 in the bottom wall of bar 1, the sides of which are tapered to correspond with the said tapered end of the bolt 60. Two upwardly extending studs 67, rigidly secured in the upper face of the body member 59, and positioned on opposite sides of the bar 1, act as stops for same to prevent the amplitude of oscillation of frame A increasing beyond predetermined limits. In Fig. 5 the bolt 60 is shown in its lowered position, with the bar 1 free to oscillate. It is plain that when the bolt is raised by turning the handle 65, the tapered end will enter the hole 66 and lock the bar 1 from oscillation.

I will now describe the speed adjusting and governing device G, with reference to the detail views of same, Figs. 10, 11, 12, and 13. The frame member comprises a body portion with two upwardly extending branches 68 and 69, and two bracket like portions 70 and 71. Journaled in the branch 69 is a driving shaft 72. Rotation is transmitted to this shaft from the motor 21 through a coupling, (one member of which is designated by the number 73'), a shaft 74, and a pair of spiral gears 75 and 76. The coupling consists of a disc 73 mounted on the end of the motor shaft, and a similar disc 73' mounted on the end of shaft 74. The disc 73 contains a radial slot that engages a stud 203, as may be clearly seen in Figures 1 and 9. The shaft 74 is journaled in the bracket portion 71 of the frame and carries the spiral gear 75. This gear operatively engages the spiral gear 76 which is rigidly mounted on the outer end of the driving shaft 72.

The shaft 72 is journaled in the branch 69 of the frame. On the inner end of this shaft and integral therewith is a drum portion 77 which is concentrically bored to fit the outer race of a radial ball bearing 78. The bore of the inner race of this ball bearing constitutes a bearing for the inner end of a driven shaft 79, the outer end of which is journaled in the branch 68 of the frame. Thus, the driven shaft 79 is in axial alignment with the driving shaft 72, and is free to turn independently of the latter. On the shaft 79 and adjacent the branch 69 of the frame is mounted the spur gear 23 to which reference has previously been made.

On the inner end of the driven shaft 79 and adjacent to the drum 77 is mounted a disc 80, being secured thereto by means of a taper pin in a hub portion 81. Located adjacent the face 80' of disc 80 is a brake shoe member 82, the body portion of which is substantially rectangular in contour and is provided with a surface 82', concave in form to fit the face of drum 77 and engage same with frictional contact. Secured to the disc 80 and projecting from the face 80' thereof, is a square stud 83 (Fig. 12). An armlike extension 84 on the member 82 is connected to this stud 83 through the medium of a thin plate spring 85, the ends of which are clamped to these two members by means of caps 86 which are secured thereto by means of screws as indicated. The plate spring 85 answers as a frictionless pivot connecting the brake shoe member to the stud 83, and allows the contact surface 82′ on said member to move outwardly from contact with the face of drum 77. The position of stud 83 is such that the movement of surface 82′ will be substantially in a radial direction.

A coil spring 87 is connected between a stud 88 that is secured in disc 80, and a stud 89 that is secured in the brake shoe member 82, the same extending therefrom in a direction substantially opposite that of the extension 84. Considering the assemblage of stud 89, member 82, and extension 84 as a lever fulcrumed at the stud 83, it is plain that the coil spring 87 acts to press the contacting surface 82′ into frictional engagement with the face of drum 77.

It may be observed that the device so far described answers as a means for transmitting the rotary motion of the driving shaft 72 to the driven shaft 79, through the medium of the frictional engagement of drum 77 with brake shoe 82 and the connections of same to disc 80. It may also be observed that the device will function as a speed governor, for, when the disc 80 rotates under the driving force of the friction between the surface 82′ and that of drum 77, the member 82, being of substantial mass, will develop a centrifugal force tending to separate the friction surfaces. Assuming that the tension of the coil spring 87 is just sufficient to counteract the centrifugal force when the speed of the disc is at a point somewhat below that of driving shaft 72, it is plain that any slight increase of the disc speed above that point will ease the pressure between the friction surfaces and allow a slip to take place which will continue until the disc speed reduces to the point where pressure will again be established. This action will be repeated at very short intervals and the result will be that a practically uniform speed, which depends on the tension of the coil spring, will be imparted to the driven shaft 79.

In order to make this governing device adjustable to obtain different speeds of rotation for the driven shaft 79 it is evidently necessary to be able to modify at will the effective spring tension on the brake shoe member 82. This object is gained by additional mechanism which I will now describe.

A bell crank lever, designated as a unit by the letter L is fulcrumed on trunnions between two posts 90 which are secured in the disc 80 and project from the reverse face thereof. This lever, shown more clearly in Figs. 14 and 15 comprises a plate 91, a stud 92 and two trunnions 93. The trunnions are made a tight fit in suitable holes in the ends of plate 91, and in the operation of assembling are forced into place. The stud 92 is rigidly secured in plate 91 and extends at right angles thereto as indicated.

The plate 91 lies parallel to the disc 80, and its inner end is provided with a counterbored opening somewhat larger in diameter than the shaft 79 and concentric with same. This opening forms the seat for a coil spring 94 as seen clearly in Fig. 13. For the purpose of obtaining smooth running, two counterweights 95 are secured by means of screws to the disc 80 near the periphery and on the face 80′ thereof. They are so disposed in relation to the other members attached to the disc as to effect an approximate running balance.

A circular opening 96 in plate 80 provides a passage with substantial clearance for the stud 92 to engage the stud 89 as may be more clearly seen in Figs. 11 and 12. With this arrangement the pressure of coil spring 94 on the plate 91 causes the stud 92 to press outwardly on stud 89 and oppose the tension of coil spring 87 on same, thereby reducing the effective tension on brake shoe member 82. It is plain that by varying the pressure of coil spring 94 on plate 91 the pressure between the friction surfaces may be varied and the speed of shaft 79 thereby adjusted. The mechanism for varying this spring pressure will now be described.

The end of spring 94 remote from plate 91 encircles the shouldered end of a sleeve 97 which slidably fits shaft 79. This sleeve is provided with a keyway 98 extending its full length, which cooperates with a feather 99 secured in shaft 79 to allow free endwise movement but prevent rotation on same. Mounted on sleeve 97 is a ball thrust bearing 100 of well known construction. This thrust bearing is pressed against a shoulder 101 on sleeve 97 by the two arms 102 of a forked member 103, which is rigidly secured on a longitudinally disposed bar 104 by means of a taper pin. The bar 104 slides at one end in a bearing provided in a lug 105 that is made integral with the frame, and at the other end in a suitable bore in the branch 68 of the frame.

Engaging rack teeth 106, cut in bar 105, is a pinion 107 (Fig. 13) which is fast on the inner end of a transverse shaft 108. The pinion end of this shaft turns in bearing 109 in the frame member and the other end turns in bearing 70′ in the bracket portion 70 of the frame. On the outer end of the shaft 108 is mounted the hand wheel 31 previously referred to. A manually operable means is thus provided, through pinion 107 and rack teeth 106, to slide the bar 104 endwise in its bearings. The movement of the bar imparted by the hand wheel will be transmitted by means of the forked member 103 and the ball thrust bearing 100, to the sleeve 97, thus increasing or decreasing the pressure of coil spring 94 on the bell crank lever L. It is now plain, in view of the foregoing explanation of the speed governing mechanism mounted on the disc 80, that the speed of the shaft 79 and gear 23 may be varied at will by the manipulation of the hand wheel 31.

The governing device as a unit is attached to the upright supporting member E, and is so located thereon that the gear 23 meshes properly with gear 24, as shown in Fig. 9. Referring to Fig. 1, the frame of the governing device is secured to the member E by means of screw 204 which passes through a suitable hole in same and enters the threaded hole 205 in branch 68 (seen in Fig. 9). The other screw 206 (Fig. 1) passes through hole 207 (Fig. 9) in the branch 68 and enters a suitable threaded hole in member E.

I will now describe the construction of the oscillation damping device and the amplitude indicating instrument; two units which have been referred to in the preceding general description of the machine. Although these are separate units, for constructional reasons it is preferable to mount both on the same support, and to transmit the oscillating movement of the frame A to them through the same connecting medium.

In the drawings the frame member of the damping device is designated by the letter K and the amplitude indicator as a whole, by the letter H. Referring particularly to Figs. 16, 17, 18 and 19, the base member of the damping device comprises a boss portion 110, an upwardly extending portion 111 and a laterally extending portion 112. The boss 110 is bored to fit a round bar 113, and is provided with a slot and a clamping screw 114 by which it may be securely gripped in position on the bar 113. This bar is secured in a horizontal bore in the supporting member E by means of the two set screws 115 as may be seen in Fig. 1, and it thus serves as a support for the base member 110 and the mechanism attached thereto.

The damping device consists of an electromagnet designated as a whole by the letter M, and a pivoted vane designated as a whole by V both of which are attached to the frame K, the latter by means of a spring pivot mechanism as shown.

The magnet M is of the well known horseshoe form, having a yoke 116, pole pieces 117 and cores 118, the latter being encircled by coils 119 which are provided with terminals 119' for connection in an electric circuit. The yoke and pole pieces are secured to the ends of the cores by screws in the usual manner as indicated. The magnet is attached to an arm 120 of the frame K by means of two screws 121 threaded in the pole pieces 117 as may be seen in Figs. 16 and 18, the pole pieces being so positioned that an air gap 122 is formed between them.

The vane unit V is shown on an enlarged scale in Figs. 25, 26, and 27. The essential members of the pivot mechanism in this unit are the two bars 123 and 124. These bars are rectangular in form and are flexibly connected to each other by means of thin plate springs, which I will hereinafter call pivot springs. Two of these, 125 and 126, which I will call the main pivot springs, are horizontally disposed at a substantial distance apart to insure lateral rigidity of the vane. A third pivot spring 127 is vertically disposed between the main pivot springs for the purpose of maintaining proper alignment. The manner of attaching the pivot springs to bars 123 and 124 will be clear by reference to Fig. 27, which being a section on line 27—27 in Fig. 25 discloses the main pivot spring 125. The ends of this spring are rigidly clamped against the horizontal faces of the bars by means of screws 128 and clamping plates 129, these members being identical for both bars. The bars have their vertical faces in substantial alignment, and in order to provide free portions of the springs for flexing, the corners of the bars are provided with rabbets as shown. The manner of attaching the other main pivot spring 126 is, as may be seen, the same as that just described for spring 125, and as may be seen in Fig. 26, the description, also answers for attaching the vertical pivot spring 127, the screws and clamping plate members being identical for all three springs.

An angular bracket member 130 is secured to the vertical face 131 of bar 124 by means of two screws as indicated. To the front side of this bracket is secured by means of rivets 132 a segment member 133, so positioned that its convex face is concentric with the axis through the intersection of the main and vertical pivit springs, about which the vane V oscillates. To the rear side of the bracket member 130 is secured by means of screws, a vane 134 which is made of a non-magnetic metal of high electrical conductivity, preferably aluminum. The bar 123, which acts as a support for the vane mechanism as well as for the pivot springs, is secured to the frame K by means of screws 135, and is located thereon in such a position that the body portion 134' of vane 134 will oscillate with clearance within the air gap 122.

The mechanism of the amplitude indicator comprises a drum 136 which is provided with trunnions that turn in ring jewel bearings. The rear bearing 137 is secured to a rigid back plate member 138, and the front bearing is mounted on a plate 139 which is supported by two pillars 140 that are secured in the back plate 138. On the front end of drum 136 is mounted a hand or pointer 172 which is counterbalanced by a weight 173 attached to a depending portion by means of a rivet as indicated. The pointer 172 sweeps a dial 174 which is mounted on four ports 175 that are secured in the back plate 138. The dial is shown in Fig. 16 as having a portion broken away to expose a part of the mechanism to be described. A case 208 is secured by means of screws, as indicated, to four studs 209 which are secured in back plate 138.

The mechanism as a whole is supported on a vertical post 141 which is secured in a socket bored in an upwardly extending boss 143 on the frame K by means of a set screw 144. A bracket member 145 is provided with a split bore encircling the post 141 and is clamped thereto by means of a clamping screw 146. The back plate member 138 of the mechanism is attached to the bracket member 145 by two screws, one of which is seen at 147 in Fig. 3.

A flexible band 148 preferably made of thin spring steel is employed to effect an operative connection between the vane V of the damping device unit and the drum 136 of the indicator unit. This band is attached at its upper end to the drum 136 on the reverse side of same as viewed in Fig. 17 by means of a suitable screw 142. It is wrapped a partial turn about the drum in a counterclockwise direction, and is attached at its lower end to the segment 133 by means of screw 149. (See Fig. 26.) Two similar bands 150 disposed on opposite sides of band 148 are also attached at their ends to the same side of the drum 136 by means of screws that are identical with screw 142. These bands are wrapped a partial turn about the drum in a clockwise direction and extend upwardly therefrom. The manner in which the three bands are wrapped about the drum 136 and are secured to same by means of screws 142 is better shown in Fig. 19 which is a view of the drum by itself and viewed from the reverse side thereof.

The upper ends of the two bands 150 are connected to a spreader bar 152, the ends of same being slitted to receive the bands, which are held therein by means of small pins as indicated. In a hole in bar 152, midway between the bands 150, is hooked the lower end of a coil spring 153, the upper end of same being hooked on a post 154 that is secured in the back plate member 138. This coil spring 153 serves to keep the bands taut, and exerts a torque on drum 136 that tends to rotate it in a clockwise direction. The middle band 148, by its connection to the vane V opposes the tension of spring 153 and exerts a torque on the drum tending to rotate it in a counterclockwise direction. Thus it is plain that the coil spring 153 serves to keep the bands taut, and that an oscillating motion imparted to the vane V will, through the medium of the bands impart a rotary motion to the drum 136 and cause the pointer 172 to sweep the dial 174.

I will now describe the mechanism connecting the pivoted frame A with the vane V, by which the oscillating motion is transmitted and changed from a horizontal to a vertical direction. The mechanism comprises a sector 155 which is pivotally supported by means of a spring pivot mechanism comprising three pivot springs secured to two bars by means of screws and clamping plates, all of which are identical with corresponding members in the above described spring pivot mechanism forming part of the vane unit. The bar 123′ corresponds to bar 123 and bar 124′ to bar 124 in the previously described mechanism, the bar 123′ being attached to the laterally extending portion 112 of the base member by means of two screws 156.

The sector member 155 is secured by means of screws 157 to the under face of bar 124′. The faces 158 and 159 of the sector member are concentric with the axis through the spring pivot and have equal radii. To the lower end of face 158 is attached by means of screw 158′ a thin flexible steel band 160, which extends upward and, through the means of a coupling 161 is joined to a band 162, the upper end of which is attached by means of a screw 163 (see Figs. 25 and 26) to the upper end of segment 133 on the vane unit V. A similar band 164 attached to face 159 by means of screw 165 extends in a horizontal direction and connects to the bar 1 of frame A. The connecting means consists of a bracket 166 attached to the side face of bar 1 by means of screw 167, and a thin flexible plate spring 168 clamped at one end to said bracket by means of screw 169 and attached at the other end to a coupling 170 by means of which connection is made to the horizontal band 164.

The tension of the coil spring 153 on the spreader bar 152 keeps the bands 150, 148, 162, 160, and 164 taut, and it is plain that a horizontal oscillating motion of the frame A will impart a vertical oscillating motion to the vane V. The faces 158 and 159 of sector 155, and also the face of segment 133, all being segments of true cylinders, on which the several bands wrap themselves, it is evident that the amplitude of the motion of vane V will be proportional to that of the frame A. Likewise, the band 148, being connected to the true cylindrical face of segment 133 and being wrapped on the cylindrical surface of drum 136, the amplitude of the point 172 will also be proportional to that of vane V, and hence to that of the frame A. It is therefore plain that, by the proper calibration of the scale on dial 174 the pointer will indicate thereon the measure of the amplitude of the frame A.

The meter unit H is adjusted on the post 141 at such a height that when the vane V is in a central position with respect to the pole pieces 117, the pointer 172 will stand at 0 on the dial 174. Also, the horizontal band 164 is made a proper length so that when the pointer is in this position on the dial, the bar 1 will rest in its neutral position midway between the stops 67. Adjustment for this neutral position as effected by turning the thumb knob 54. The tension of the take-up spring 153 on the bar 1 through the medium of the several bands is counteracted by the torsion rod 47. Turning the upper end of this rod one way or the other by means of the knob will evidently swing the frame accordingly. Therefore, by a proper manipulation of the knob, the pointer may be brought to its zero position.

The magnet M of the damping device is connected in a direct current circuit, the source of supply being preferably a storage battery. A circuit is shown diagrammatically in Fig. 1, in which the storage battery is designated at N. The adjustment for flux density of the magnetic field may be effected either by varying the reluctance of the magnetic circuit; (by means of a variable air gap or other well known means) or by varying the strength of the energizing current. The latter method being the more simple is here disclosed.

Referring to Fig. 1, a rheostat is indicated at R, which is for the purpose of adjusting the strength of the current in the magnet coils, and an ammeter is indicated at I, which is provided so that, by proper adjustment of the rheostat R, the strength of the current, and hence the magnetic flux density may be kept uniform. A switch S is provided for closing and opening the circuit.

For the purpose of determining the radial direction, or phase, of the resultant centrifugal force, or unbalance, in the rotor so that corrections may be applied thereon in proper locations, the above referred to mechanism designated by the letter D in Figures 1, 2, 3, and 6 is provided. Referring to the detail views of this unit, Figs. 20 to 24 inclusive; a disc 176 having a hub portion 177 is mounted on the end of shaft 25, and secured thereto by means of a taper pin. Secured in the hub portion 177 and extending therefrom in a radial direction is a stud 178. A weight 179 is slidably fitted on this stud, being limited in its sliding movement in an outward direction by a head 180, and in an inward direction by a flat surface 175 on the hub portion.

The weight 179 is provided on one side with two transversely cut V shaped notches 181 and 182 spaced a definite distance apart. Engaging these notches is a lever 183, which is attached at one end to a pivoted bar 184 by means of screws 185. This bar is pivotally mounted between two supports 186 by means of conical pivot screws 187, threaded in said supports and engaging conical depressions in the ends in the said bar. The other end of lever 183 is bent at right angles as shown and has its edge V shaped to conform to the notches 181 and 182. The middle portion of the lever is enlarged and provided with an opening large enough to clear the hub portion 177 which projects through it. The V shaped end of the lever normally rests in the notch 181 as indicated, and is held therein with pressure by means of a flat spring 188. As may be seen more plainly in Fig. 22, this spring is secured to a lug 189 integral with the disc 176 and its free end rests with pressure against one side of a notch in a stud 190 which is secured in the lever 183 as indicated.

The disc unit D is mounted on shaft 25 in such a relation to the gear wheel 35 that, when the above referred to mark on its hub portion 35' registers with the index mark on clip 202, the radial direction of the stud 178 is vertical.

A second hub portion 191 projects from the front side of disc 176, the same being turned true to fit the bore of a sleeve 192. This sleeve is longitudinally slotted as shown and provided with lugs to receive adjusting screws 193 by which it may be adjusted to a close, yet freely sliding fit on the hub portion 191. A pin 194, secured in the wall of sleeve 192 operates in an elongated opening in hub 191, serving to prevent turning of the sleeve on same, and to limit its sliding movement in the direction away from the disc; movement toward the disc being limited by the shoulder 195 thereon.

Two studs 196 are secured in diametrically opposite positions in lugs 197 on sleeve 192. These studs extend through suitable openings in disc 176, and the ends of same are normally in contact with the enlarged middle portion of lever 183 when the sleeve 192 is in the position shown in the figures. A shouldered head 198 is tightly fitted in the end of sleeve 192 to provide a means by which it may be moved toward the disc by pressure of the hand.

The rim portion of disc 176 is provided with a series of holes 199, preferably 36 in number spaced 10° apart and disposed in a circle, one of the holes 199' lying in the same axial plane as the stud 178. The holes are all alike in diameter and are tapered to fit the shank 200 of a plug J shown in Fig. 24, so that it may be pressed securely in, and by twisting, easily removed from any one of the holes. In practice several of these plugs with head portions of different weights are provided for a purpose to be later described. On the peripheral face of disc 176 and in radial line with the holes 199 are stamped numbers 0 to 180, indicating degrees, the number 0 being in line with the hole 199'. The purpose of the holes and the plug shown in Fig. 24 will be later explained.

The normal position of the weight 179 is that indicated in the figures; the V shaped end of lever 183 resting in the notch 181. While in this position the disc is placed in rotative balance, the same being effected by cutting away material from lugs 201 which are provided for that purpose. The balancing operation is preferably performed while the mechanism is mounted in place on the shaft 25.

When the machine is operating and this unit D is rotating, the weight 179 will, due to centrifugal force, tend to move outward on the stud 178. If, while the rotation continues, the head 198 of sleeve 192 is pressed by the hand of the operator, the lever 183 will be pushed back by studs 196, and the weight 179 will move to its outward limit against head 180 with notch 182 opposite the V shaped end of lever 183. When the pressure of the operator's hand is released from the head 198 the lever 183 will, under the pressure of spring 188, move back to place with the V shaped end in the notch 182 and hold the weight in its new position. The disc is thus thrown out of balance by a known amount depending on the mass of weight 179 and the distance between the two notches 181 and 182 in same.

The preceding description covers the mechanism of a preferred form of machine embodying the invention. I will now proceed to describe the operation of same.

In the complete operation of balancing a rotative body, or rotor, the procedure is to make measurements (by means of the balancing machine) which will indicate the magnitude of two corrections to be applied in two transverse planes, known as correction planes, located a substantial distance apart along the axis of rotation. The rotor is then removed from the machine and the corrections determined in the measuring operation are applied, one in each plane, which will place the body in a state of running balance.

The unit for centrifugal force commonly employed in unbalance measurements is the ounce inch, which may be defined as a centrifugal force equal to that produced by a weight of one ounce revolving at a distance of 1 inch from the axis of rotation.

In machines of the type herein described, what we actually measure is not the centrifugal force, but rather the movement of the effective centrifugal force about the pivotal axis on which the frame of the machine oscillates. In arriving at the magnitude of the correction to apply, the measured moment is divided by the distance of the correction plane from the pivotal axis. The unit for the moment of force about the pivotal axis is the ounce inch inch, which may be defined as the moment of a centrifugal force of one ounce inch, acting on the axis of rotation at a distance of one inch from the pivotal axis.

In quantity production, where measuring operations for unbalance are to be successively performed on similar rotors, the first step is to determine a calibration constant by which to multiply the readings taken from the amplitude indicator to obtain the moment of the centrifugal force generated, from which the magnitude of the correction can then be calculated. The procedure in determining the calibration constant for the machine is as follows:

One of the quantity of rotors to be balanced is first placed in perfect running balance, which may be accomplished in the machine by the slow, but well known and reliable method of applying trial weights successively in different positions in the correction planes until the result of perfect balance is obtained as evidenced by a zero reading of the amplitude meter while the rotation is at resonance speed. This perfectly balanced rotor is known as the master rotor.

With the bolt 60 in raised position as shown in Fig. 4 this master rotor is mounted on the frame A as shown in Fig. 2. The bolt 60 is then lowered by means of handle 65 to the position shown in Fig. 5, thus releasing the frame and allowing it to swing freely between the limits of stops 67. An adjustment of the frame to neutral position, as indicated by the meter pointer 172 resting at 0, is then made by means of the thumb knob 54. The switch S is then closed, thus energizing the magnet M, and the motor 21 is started. The rotor being in perfect balance, no oscillation will occur as will be evidenced by the pointer 172 remaining in its position of rest. The weight 179 on the disc unit W is then released by pressing the hand against the head 198, allowing the weight to shift to its outer position, thus throwing the disc out of balance a known amount. The effect of this unbalance on the frame A will cause it to oscillate. The speed of rotation is then varied one way or the other by manipulating the hand wheel 31 until resonance speed is obtained, which is evidenced by the amplitude meter showing a maximum reading. The centrifugal force generated by the revolving weight 179, being a known quantity in the plane $w-w$, its moment about the pivotal axis $P-P$ is also a known quantity. This quantity divided by the maximum reading noted, gives the moment per division on the scale, which result is the calibration constant.

For example; assuming the weight 179 to weigh 2 ounces, and the distance between the notches thereon ½ inch, the centrifugal force generated will be 1 ounce inch. Then assuming the distance of plane $w-w$ from the pivot plane $P-P$ to be 20 inches, the moment of the centrifugal force will be 20 ounce inch inches. If the noted maximum reading of the meter is 10 divisions on the scale, the moment per division will be 20 divided by 10, or 2 ounce inch inches. Thus the calibration constant will be 2.

In the regular balancing operation, the calibration constant having been determined, an unbalanced rotor is mounted in the machine and the weight 179 is placed in its inner position with the disc unit D in balance. The magnet M remaining energized, the motor is started, and the maximum reading of the meter is obtained in the manner above described. The oscillation now being due to the centrifugal force generated in the rotor, the maximum reading of the meter when multiplied by the calibration constant, will give the moment of this force about the pivotal axis. This moment must be divided by the distance of the correction plane C—C in the rotor, from the axis P—P to obtain the magnitude of the correction in ounce inches to be applied on the rotor in that plane. Thus; continuing the above example, if the maximum reading was 6 divisions, the moment of the centrifugal force would be 12 ounce inch inches. Then if the distance of the correction plane from the pivotal axis is 16 inches the correction to be applied would be 12÷16 or .75 ounce inches.

In a magnetic damping device such as herein disclosed it is well known that the damping force generated depends on the flux density of the magnetic field, so, evidently the maximum amplitude of oscillation may be varied by varying the current strength in the magnet M. As a means for varying the current is provided in the rheostat R, it is convenient, in the operation of calibrating, to adjust the damping force thereby to a point where the constant will be unity. This will give the advantage that the meter readings taken will represent directly the moment of the centrifugal force and do away with the necessity of calculation.

It is obvious that an alternate method of measuring the moment of centrifugal force may be employed, in which the speed of rotation is adjusted to resonance, and simultaneously, the rheostat R is adjusted until a certain arbitrary reading of the meter is obtained. The reading of the ammeter I may then be noted, and the unbalance calculated therefrom. For instance; at the start the rotation may be brought to resonance speed while the adjustment is for a very slight damping force, under which condition the amplitude due to even a slight unbalance will be very great. The amplitude is then gradually decreased by increasing the damping force, until a reading of say 10 divisions on the scale is reached. Then by reference to a previously calculated chart, the unbalance corresponding to the reading of ammeter I may be determined. This method, however, is cumbersome and therefore the first described method is preferred.

The phase angle of the centrifugal force in the rotor is determined by a second measuring operation. After the magnitude of unbalance has been measured in the manner above described, and the maximum meter reading noted, the weight 179 on the disc unit is shifted by pressing the hand on head 198. The centrifugal force then generated in the disc will (except in rare instances) be acting in a different direction than that acting in the rotor. With this condition existing, a second maximum reading of the meter taken will evidently represent the resultant of the two forces, one in the rotor and the other in the disc. The magnitudes of the centrifugal forces in both rotor and disc being known, and their resultant having been measured by the last operation, the phase of one with respect to the other may be determined by means of a force diagram as follows. Referring to Fig. 29, a vertical line $ow'$ is drawn, representing by its length the moment of the centrifugal force generated by the rotation of weight 179. Then from $w'$ as center, and with a radius representing the moment of the centrifugal force generated in the rotor, as determined by the first meter reading, an arc $y$ is drawn. Then from $o$ as center, with a radius representing the resultant determined in the second reading, another arc $z$ is drawn, intersecting the first arc $y$ at the point $m$. The direction of a line $on$ drawn parallel to $w'm$ will be the direction of the centrifugal force generated in the rotor, with respect to that generated in the disc, and the angle $\phi$ between the lines $ow'$ and $on$ may be called the phase angle of unbalance.

In practice it is desirable to determine the phase angle by reference to a table in which the angle corresponding to successive values of the first and second meter readings have been calculated. Thus the result is obtained more quickly than by the construction of a diagram.

Having determined the phase angle, it is necessary to establish a point in the correction plane on the rotor from which the phase angle may be laid off and the position of the correction determined. The procedure is as follows: the rotor is turned so that the mark on the hub face 35′ of gear 35 registers with the index mark on clip 202, and then by means of any suitable gage a reference mark is made on correction plane C—C of the rotor in line with this mark. After the rotor is removed from the machine, the angle $\phi$ is laid off from the reference mark and the location for the correction is thus determined.

It may be noted that the method above described does not indicate on which side of the reference mark on the rotor to lay off the angle $\phi$. For quantity production the rotor is often designed with the distribution of mass such that the locations for corrections will always be on the same side of the reference mark. When this is possible, no further operation than determining the phase angle is necessary. Under other conditions, it is necessary to determine by a trial correction, on which side of the mark the angle should be laid off.

A convenient means for applying a trial correction is provided in the plug J, cooperating with the disc unit D. From the preceding explanation it is evident that the centrifugal force due to unbalance in the rotor may be counteracted by a centrifugal force generated in the disc by a trial correction applied thereon, provided the trial correction is placed in a radial direction with respect to the 0 mark the same as that of the unbalance in the rotor with respect to the reference mark thereon. In other words, if the direction of the trial correction on the disc is parallel to the direction of the centrifugal force in the rotor, the centrifugal force generated by the trial correction will oppose that in the rotor.

To make the reason for the above described method clear, I will explain as follows: The disc, rotating as it does, in the same direction, and in synchronism with the rotor, the 0 mark on the disc will, during rotation, be constantly in a radial direction corresponding to the radial direction of the reference mark on the rotor. The centrifugal force in the rotor, and that in the disc unit, act on opposite sides of the pivotal axis P—P. Therefore, any centrifugal force in the rotor, acting in a certain radial direction with respect to the reference mark, will be equivalent in its effect on the pivoted frame, to a centrifugal force in the disc acting in an opposite radial direction with respect to the 0 mark thereon. Representing this diagrammatically; let the vector $d$ in Fig. 30 represent the moment of force in the disc due to weight 179, and the vector $e$ the moment of force generated in the rotor. The moment $e$ in the rotor will be equivalent to a moment in the disc in the opposite direction as represented by the vector $e'$. By the parallelogram of forces we may obtain the vector $r$ which represents the magnitude that would be determined by the second meter reading under these conditions. The vector $e$, being in the radial direction of the centrifugal force in the rotor, the angle $\phi$ is the phase angle with respect to the reference mark thereon.

After the phase angle in degrees has been determined in the manner described above, the motor 21 is stopped, the weight 179 is placed back in its normal position, and a plug J is inserted in one of the holes 199 at approximately the angle $\phi$ from and on either side of the 0 mark. Several calibrated plugs being provided, one is selected that will produce a centrifugal force, the moment of which is less than double the moment indicated by the first meter reading. An extra run then is made and the meter reading noted. If this last reading is less than the first reading, the direction of the centrifugal force in the rotor with respect to the reference mark, is the same as the direction of the plug J with respect to the 0 mark on the disc. Therefore the phase angle must be laid off in the direction from the reference mark on the rotor, corresponding to the direction of the plug from the 0 mark on the disc. If the reading taken in this extra run is greater than the first reading, then the phase angle must be laid off from the reference mark on the rotor in the opposite direction to that of the plug J from the mark 0.

I claim:

1. In a balancing machine, the combination with a frame member adapted to oscillate about a pivotal axis, bearings on said member for rotatably supporting a body to be tested; of means for transmitting rotary motion to said body from a source of power, said means including a pair of toothed gear wheels in mesh and so disposed that the pitch circle of each is substantially tangent to said pivotal axis.

2. In a balancing machine, the combination with a pivotally supported oscillatory frame member provided with means for rotatively supporting thereon a body to be tested, and a spring associated with said frame member whereby the latter is caused to oscillate with harmonic motion about the pivotal axis, of a means for rotating the body, a means for indicating the amplitude of the oscillation due to centrifugal force generated in the rotation of the body, and means for applying to said frame member a damping force the magnitude of which is proportional to the angular velocity of said frame about said pivotal axis.

3. In a balancing machine, the combination with an oscillatory frame member provided with means for rotatably supporting thereon an unbalanced body to be tested and adapted to oscillate about a pivotal axis, and a spring controlling the oscillation of said frame member, of means for causing the body to rotate, adjustment means adapted to bring the periods of oscillation and rotation into synchronism, means for applying to said frame member a damping force the magnitude of which is directly proportional to the angular velocity of oscillation, and means for measuring the amplitude of oscillation while the body is being rotated at a constant speed.

4. In a balancing machine comprising a frame member adapted to oscillate about a pivotal axis, and a spring controlling the oscillation thereof, means for rotatably supporting a body to be tested on said frame member, means for rotating said body at the speed of resonance, means for causing a damping force proportional to the angular velocity of oscillation to act on said frame member, and means for measuring the amplitude of oscillation while said frame member is under the influence of said damping force.

5. In a balancing machine comprising a frame member mounted to oscillate on a pivotal support, a spring associated with said frame member to produce a natural period of oscillation of same, a means for rotatably supporting a body to be tested on said frame, means for imparting rotation to said body from a suitable source of power, means for adjusting the speed of rotation to that of resonance, means for applying a force opposing the oscillation of said frame, the magnitude of said force being proportional to the angular velocity of oscillation, and a means for measuring the amplitude of oscillation.

6. In a balancing machine, the combination with a pivoted oscillatory frame adapted to rotatively support an unbalanced body to be tested, a spring cooperating with said frame to control the character of the oscillatory motion, and a means for rotating said body at the speed of synchronism with the oscillations, of a measuring device adapted to measure the amplitude of oscillation of said frame, and an oscillation damping device comprising a magnet possessing a field, a pivoted vane made of non-magnetic material possessing electrical conductivity disposed to oscillate in said field, and a connecting means whereby the oscillatory motion of said frame is imparted to said vane.

7. In a balancing machine, the combination with a pivoted oscillatory frame adapted to rotatively support an unbalanced body to be tested, a spring cooperating with said frame to control the character of the oscillatory motion, and a means for rotating said body at the speed of synchronism with the oscillations, of a measuring device adapted to measure the amplitude of oscillation of said frame, and an oscillation damping device comprising a magnet possessing a field, a pivoted vane made of non-magnetic material possessing electrical conductivity disposed to oscillate in said field, a connecting means whereby the oscillatory motion of said frame is imparted to said vane, and a means for varying at will the magnetic flux density of said field.

8. In a balancing machine, the combination with a pivoted oscillatory frame adapted to rotatively support an unbalanced body to be tested, a spring cooperating with said frame to control the character of the oscillatory motion, and a means for rotating said body at the speed of synchronism with the oscillations, of a measuring device adapted to measure the amplitude of oscillation of said frame, and an oscillation damping device comprising an electromagnet provided with coils and possessing a field, an oscillatory vane made of electrically conductive non-magnetic material disposed to oscillate in said field, a connecting means whereby said vane is caused to oscillate in unison with said frame, an electric circuit and source of electric current adapted to energize the coils of said magnet, and a means for varying at will the strength of said energizing current to vary the flux density of said field for the purpose described.

9. In a balancing machine, the combination with an oscillatory frame mounted on pivots carried by a rigid supporting member, and adapted to rotatively support a body to be tested; of a torsion spring disposed in axial alignment with said pivots and attached at one end to said supporting member and at the other end to said frame for the purpose of controlling the oscillation of the latter.

10. In a balancing machine, the combination with an oscillatory frame mounted on pivots carried by a rigid supporting member, said frame being adapted to rotatively support a body to be tested; of a torsion spring disposed in axial alignment with said pivots and connected between said support and said frame, and means for adjusting the working length of said torsion spring to vary the period of oscillation of said frame about its pivotal axis.

11. A balancing machine, including a frame member adapted to oscillate on a pivotal axis and to rotatably support a body to be tested, a rotative member disposed at a substantial distance from said pivotal axis and journaled on the frame member with its axis parallel to the axis of said body, a means for imparting rotary motion to the body and said member whereby they are rotated in synchronism, and means on said member for throwing same out of balance at will by a fixed amount and in a radial direction having a fixed phase relation with a suitable reference point on said body, said last named means comprising a radially slidable weight, a locking means for retaining said weight in normal position with the member in balance, and a means whereby said locking means may be moved to release said weight while said member is rotating, thereby allowing said weight to slide outward and throw said member out of balance.

HORACE B. McCABE.